(No Model.)

J. BAY.
MIRROR.

No. 382,291. Patented May 8, 1888.

WITNESSES:

INVENTOR.

(No Model.) 2 Sheets—Sheet 2.
J. BAY.
MIRROR.
No. 382,291. Patented May 8, 1888.
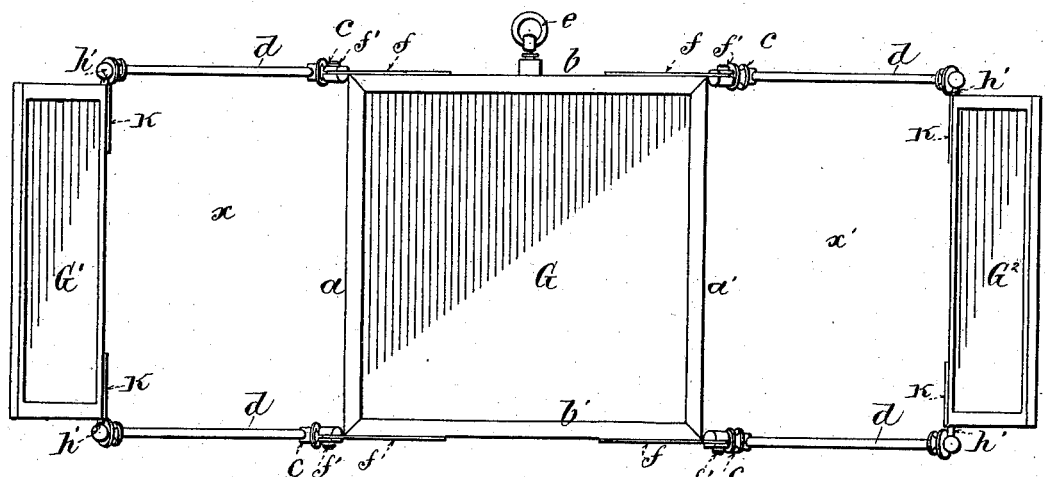
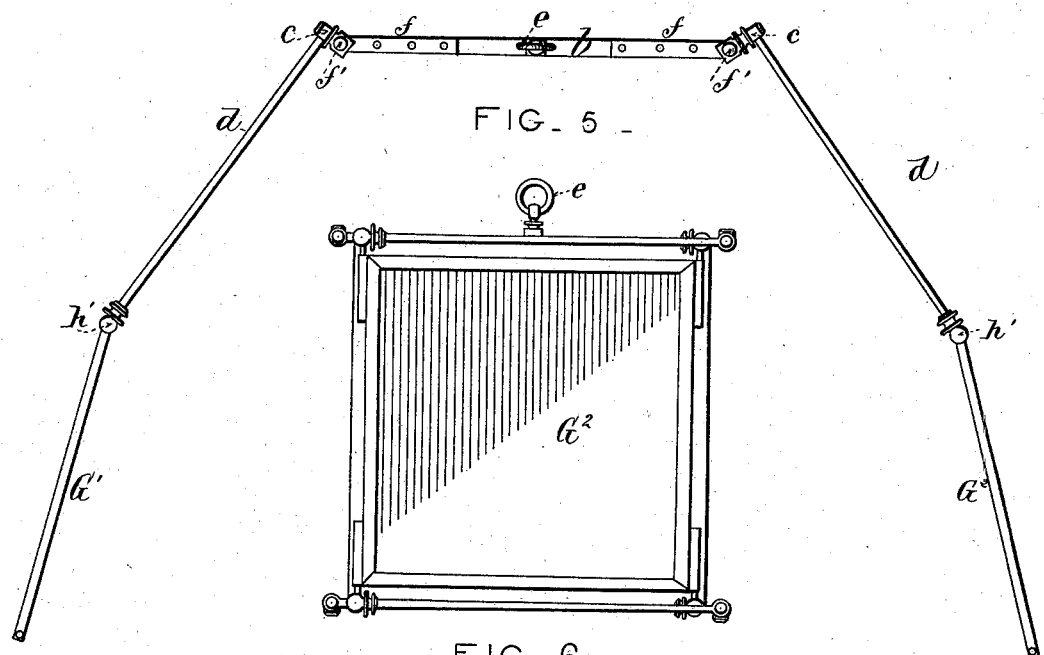
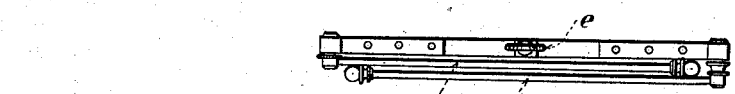
WITNESSES. INVENTOR.

UNITED STATES PATENT OFFICE.

JACQUES BAY, OF PARIS, FRANCE.

MIRROR.

SPECIFICATION forming part of Letters Patent No. 382,291, dated May 8, 1888.

Application filed July 30, 1887. Serial No. 245,671. (No model.)

*To all whom it may concern:*

Be it known that I, JACQUES BAY, manufacturer, a citizen of France, residing in Paris, have invented a new and useful Improvement in Triple Mirrors, of which the following is a specification.

This invention relates to certain improvements in mirrors of the class shown in United States Patent No. 349,333.

Reference is to be had to the accompanying drawings, forming part of this specification, in which—

Figure 1:
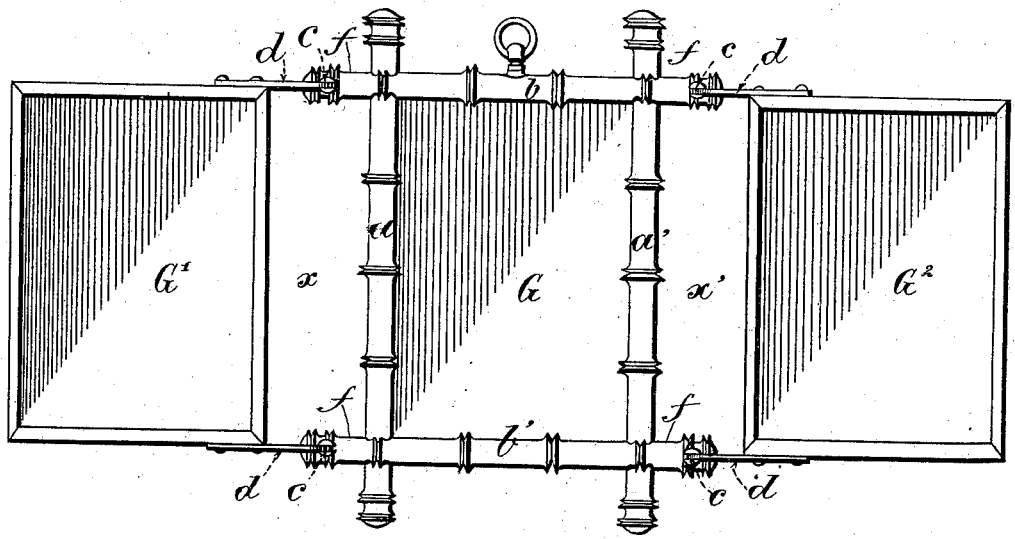
Figure 2:
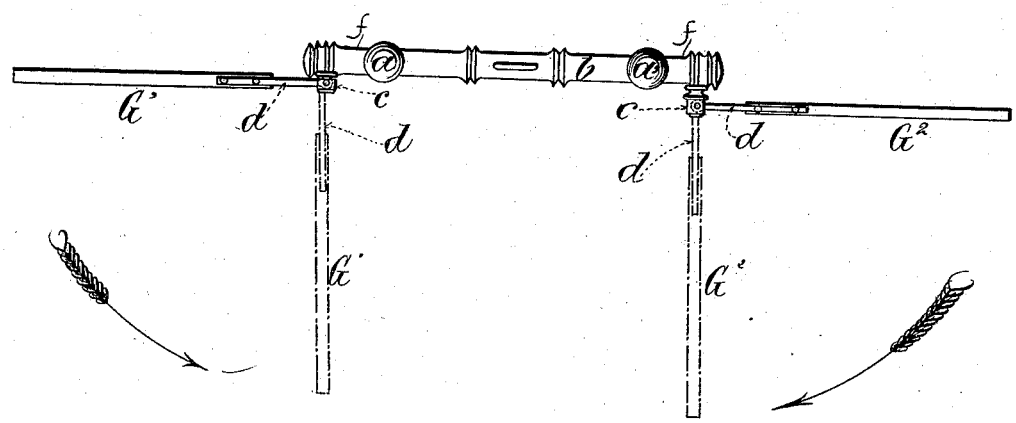

Figure 1 is an elevation of a mirror constructed according to my invention, the same being shown extended, and Fig. 2 is a plan thereof. Fig. 3 is an elevation of another form of said mirror, shown extended. Fig. 4 is a plan thereof. Fig. 5 shows the mirror folded, and Fig. 6 is a plan thereof.

The center glass, G, of the mirror is held in a frame-work, any of the sides of which may have horizontal extensions $f$. On the extensions of the horizontal sides $b$ $b'$ are links $c$ $c$, which may be rigid, as in Figs. 1 and 2, or swiveled, as in Figs. 3 and 4. To the links $c$ $c$ are attached rods $d$ $d$. These may be pivoted to the links $c$ $c$, as in Figs. 1 and 2, or secured thereto, as in Figs. 3 and 4, where the links $c$ $c$ are pivoted. To the rods $d$ $d$ the two movable glasses $G'$ $G^2$ are connected. They may be secured to said rods, as in Figs. 1 and 2, or the glasses $G'$ $G^2$ may be pivoted to the rods $d$ $d$, as in Figs. 3 and 4, wherein pivots $h'$ on the rods $d$ fit in plates $k$ attached to the glass frames. When pivoted to the rods $d$, the glasses $G'$ $G^2$ may be folded one on the other, so that one glass may be exposed outside so as to be used as a single glass.

As shown in Fig. 2, the links $c$ $c$ on one side may be shorter than those on the other, thereby permitting one glass to be folded over the other. The extensions of the sides $b$ $b'$ form back-stops to the rods $d$ $d$, so limiting their extension.

In extending the glasses $G'$ $G^2$ open spaces $x$ $x'$ are left between the frames of the movable or outer glasses and the inner frame, which are necessary to effect the desired separation and to keep the parts forming the mirror clear. A ring, $e$, attached to the rod $b$ of the main frame-work, is for suspending the mirror to a support.

By making the rods $d$ $d$ in length about equal to the breadth of the central glass frame, as in Figs. 3, 4, 5, and 6, one of the glasses $G'$ $G^2$ can be exposed outside by turning it on its pivot $h'$, as stated.

By the above construction the movable glasses can be greatly extended from the center glass, and swung in front thereof to permit all parts of the head to be seen.

I claim as my invention and desire to secure by Letters Patent—

1. In a folding mirror, the combination of the three glasses G $G'$ $G^2$, frame $a$ $a'$ $b$ $b'$ on glass G, the movable glasses $G'$ $G^2$, having extending-rods $d$ $d$, and the frame $a$ $a'$ $b$ $b'$, having links $c$ $c$, to which the rods $d$ $d$ are attached, whereby glasses of restricted dimensions can be greatly extended from and swung in front of the center glass to permit all parts of the head to be seen, substantially as described.

2. In a folding mirror, the combination of the three glasses G $G'$ $G^2$, frame $a$ $a'$ $b$ $b'$ on glass G, said frame having immovable extensions, pivoted links $c$ $c$, carried by said extensions, extension-rods $d$ $d$, pivotally connected to the glasses $G'$ $G^2$, the rods $d$ $d$ being also attached to the links $c$ $c$, whereby glasses of restricted dimensions can be greatly extended from the center glass and swung in front thereof, and whereby also one of the movable glasses may be folded over the center glass so as to serve as a single looking-glass, substantially as herein shown and described.

JACQUES BAY.

Witnesses:
 JOS. B. BOURNE,
 ALPHONSE BLÉTREY.